United States Patent Office 2,902,052
Patented Sept. 1, 1959

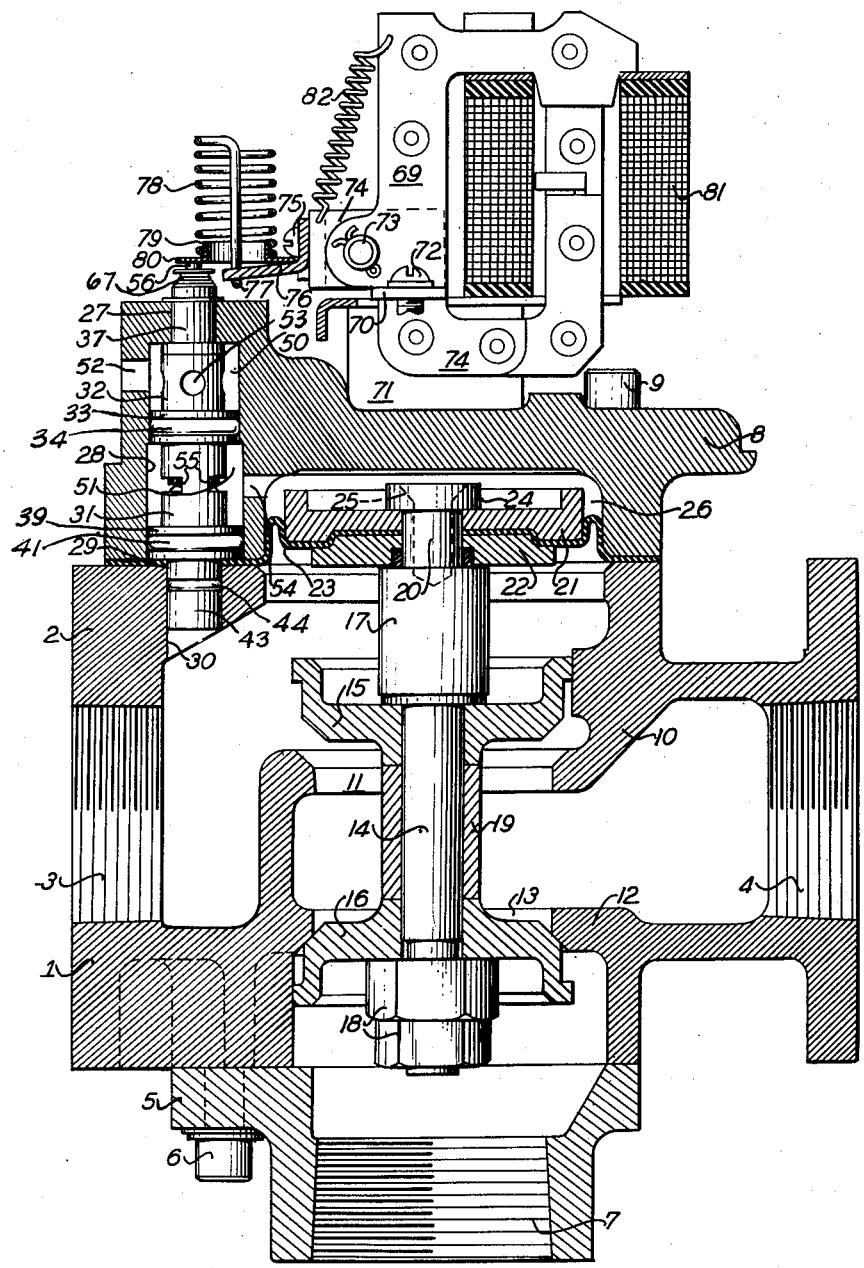

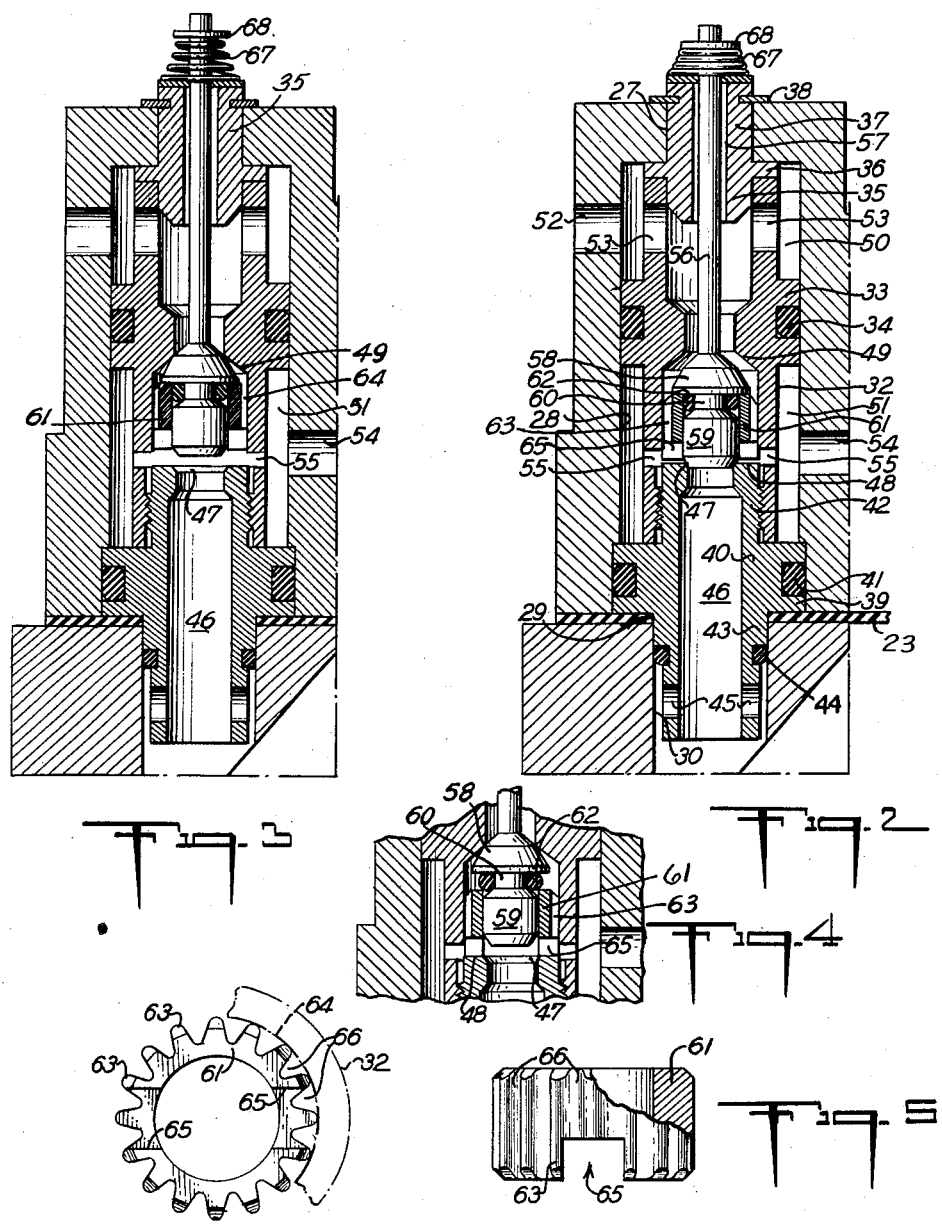

2,902,052

MAGNETIC VALVES

Jan R. Ohlsson, Lidingo, Sweden, assignor to The Clark Controller Company, Cleveland, Ohio, a corporation of Ohio Application March 22, 1954, Serial No. 417,795

7 Claims. (Cl. 137—620)

This invention relates to valve constructions and modes of operation thereof; and particularly to valve constructions of the type that, when operated, open a supply valve between an air pressure supply source and a pressure operated apparatus to supply pressure thereto; and when restored close the supply valve and open an exhaust valve to exhaust pressure from the apparatus.

One important use of the invention is in connection with brakes for power operated machines, for example presses.

Such brakes, as is well known, are released by air pressure supplied to a brake cylinder or other pressure chamber from a source of supply pressure; and set automatically, mechanically, for example by a spring, when pressure is exhausted from the brake cylinder; and reference to such use, as an illustrative example, will be made herein as a part of the description to make this disclosure concrete; although as will hereinafter appear to those skilled in the art the invention may be applied to other uses.

The construction comprises a main housing with the said supply and exhaust valves and valve ports therein; and connections for conduits coming from the pressure supply source and going to a brake cylinder.

The valves are of the so-called opposed poppet valve type, and are connected together in axial alignment, so that when one opens its port and vice versa, the other closes its port; and to thus reciprocate the valves in unison, they are connected to the movable wall of a contractible and expansible pressure chamber, and air pressure from the source is supplied to and exhausted from the chamber.

Supply of air to the chamber and exhaust therefrom is effected by a small pilot valve construction comprising valve ports and a reciprocatory valve element provided with valves.

The pilot valve element is reciprocated in one direction by an electromagnet when it is energized, and then operates its valves to exhaust the pressure chamber, and main source pressure outside the pressure chamber then moves the main valves to supply source pressure to the brake cylinder, to release the brake.

When the magnet is deenergized, the pilot valve element is reciprocated in the other direction by air pressure from the source, and then operates its valves to supply pressure from the source to the pressure chamber, and this effects movement of the main valves to exhaust pressure from the brake cylinder to cause the brake to set.

The foregoing general description of the operations of the pilot valves, pressure chamber, and main valves, will become clearer after a reading of the following detailed description in connection with the drawing; but is given here to emphasize the fact that safety factors are incorporated thereby as follows:

A brake as herein considered is a part of a press attended by operators who may be in a position to be injured by a moving part of the press if the brake does not set and stop the press when expected to do so.

According to the foregoing, the brake cylinder is exhausted and the brake sets whenever the electromagnet is deenergized, not when it is energized.

It will therefore set and protect the operators if it should lose its energization by a failure of exciting voltage, or by an accidental break in its energizing circuit.

Again, when the magnet is deenergized, and thereupon loses control of the pilot valve, the pilot valve is positively operated, to cause setting of the brake, by the main air supply pressure. The air supply can be relied upon for this purpose so long as the supply exists.

If, when the magnet is deenergized, and the pilot valve is at that time in position to exhaust pressure from the pressure chamber and therefore causes the main valves to supply pressure to the brake to release it, and the supply pressure should then fail, the pressure in the brake cylinder and in the conduit leading back to the valve housing and in the housing, will at least partially exhaust the brake cylinder and tend to allow the brake to set; but as an additonal safety feature, the pilot valve is spring biased to go to the position to supply pressure to the pressure chamber; and if the supply pressure fails when the magnet is de-energized, the pilot valve will go to biased position and the back exhaust pressure from the brake cylinder and in the housing as mentioned will be communicated by the pilot valve to the pressure chamber to insure that the main valves will be moved to the exhaust position and exhaust pressure from the brake and allow it to set.

Again, if the magnet is holding the pilot valve in position to cause source pressure to be supplied through the main valve to the brake to release it, and the magnet should fail, the pressure will move the pilot valve to the position to cause the main valve to go to exhaust position and set the brake.

In any such case, the press cannot be operated until the fault has been corrected.

Safety is thus incorporated by having the pilot valve under control, jointly, of both the electromagnet and supply air pressure.

Pilot valves to control operation of main valves are known, in general.

They have the advantage of being quick-acting, because they can be of small inertia; and can be operatively moved by small force; which, when a magnet is used to move them, enables the magnet to be small with advantages of economy.

However, because of their small size, pilot valves as generally constructed, have a defect that tends to introduce unreliability, which, in connection with brake controlling valves, vitiates provisions for safety; explained as follows:

The movable parts of a pilot valve are generally enclosed in a housing and their movement guided by slidingly engaging a stationary part, with clearance.

Air flowing through the pilot valve from a main supply, is often contaminated with dust, grime, etc., which accumulates in the clearance space and ultimately causes the movable parts to stick; and they may stick in their most critical position; that is, when the pilot valve is used with a brake controlling main valve, as here referred to, the position in which the pilot valve parts communicate pressure to the pressure chamber to move the main valves to effect release of the brake is a critical position; because if stuck in that position the valves cannot effect setting of the brake when expected; and operators are thereby subjected to danger of injury.

In the present invention the movable parts and the guiding parts engage each other only on thin edges extending in the direction of movement, which practically eliminates all sticking.

This is another safety feature of the invention.

But, because there is still the very remote possibility that the valve parts might stick in spite of this safety feature, the pilot valve is so constructed that if sticking should occur in said critical position, the exhaust of the brake cylinder by the main exhaust valve to set the brake will nevertheless be effected when next wanted, but thereafter the pilot valve will be inoperative to effect supply of pressure to the brake to release it, thus leaving the brake in safe set condition; and the whole valve structure is rendered inoperative until the pilot valve parts are removed and cleaned or replaced.

This is a further safety feature explained in general as follows:

The pilot valve comprises two parts that are normally held assembled together by a yieldable friction device, and normally move in unison as a single unit. One of the parts slidingly engages the guiding parts. The other is the part on which supply pressure is impressed to move the pilot valve in one direction to effect main valve exhaust and setting of the brake, and is the part which the magnet moves in the other direction and effects closing of the main valve exhaust and supplying of pressure to the brake to release it.

If the part of the pilot valve sliding on the guiding part should tend to stick thereon in other than the said critical position, the sliding part is forced to move with the other part of the critical position by force exerted by the magnet; but if it should then stick in the said critical position, main supply pressure will overcome the friction device holding the two parts together, and will move the other part to effect main valve exhaust, and the friction device will then lock the sliding part upon the said other part and prevent the next movement thereof by the magnet. The pilot valve as a whole will thereby be permanently locked against movement in the direction that would effect closing the main exhaust and communication of pressure to the brake to release it. The said lock is made inaccessible, without taking the pilot valve out of the structure.

It is therefore among other objects of the invention to provide, in a valve structure of the class described, the particular features of construction and mode of operation above mentioned, and the above specified safety features resulting therefrom.

Other objects are:

To provide generally an improved valve construction and mode of operation;

To provide generally an improved pilot valve construction and mode of operation.

Other objects will become apparent to those skilled in the art from a reading of the following description taken in connection with the accompanying drawing, in which:

Fig. 1 is a sectional view of an embodiment of the invention, with an electro magnet and a pilot valve thereof in elevation, and with the magnet in energized condition;

Fig. 2 is a longitudinal sectional view of the pilot valve of Fig. 1 to enlarged scale;

Fig. 3 is a view similar to Fig. 2 with a movable part of the pilot valve in a different position;

Fig. 4 is a fragmentary view similar to a portion of Fig. 3 showing a valve locking feature;

Fig. 5 is a side elevational view of one of the parts of Fig. 2 or 3, to still larger scale with a portion broken away and in section; and Fig. 6 is a bottom plan view of the part of Fig. 5.

Referring to the drawing there is shown at 1 generally, a main valve housing, comprising a middle portion 2 provided with a threaded inlet 3 for connection to a conduit not shown but coming from a supply source of air pressure; and comprising a threaded outlet 4 for connection by a conduit not shown, to an apparatus to be supplied with air pressure, for example the air cylinder of a brake.

A bottom housing portion 5 is secured to the middle portion 2 by screws, one being shown at 6, and is tubular to provide an air exhaust outlet 7, which is threaded for connection to a conduit.

A top housing portion 8 is secured upon the middle portion 2 by screws 9, one being shown.

The middle housing portion 2 is divided diagonally by a wall 10 having a horizontal valve port 11 therethrough; and has a bottom wall 12 having a horizontal valve port 13 therethrough communicating with the exhaust outlet 7; the ports being axially aligned.

A valve stem 14 has opposite poppet valves 15—16 secured thereon by being in the form of a bolt going through the valves 15—16 and clamping the valves thereon between a head 17 and lock nuts 18, respectively above and below the valves, with a tubular spacer 19 between the valves.

The valves are spaced so that the valve 16 is below its port 13 and the valve 15 is above its port 11; and so that when the stem 14 is reciprocated, as will be described, either port will be closed when the other is opened.

The stem 14 above the head 17 has a stub stem 20 over which are telescoped an upper and a lower disc, 21 and 22, with a flexible diaphragm 23 between them; the discs and diaphragm being clamped together and upon the head 17 by a thick washer 24 and a screw 25 going through the washer and threaded into the stub-stem 20.

The top portion 8 of the housing has a downwardly open cup form recess 26, the side wall of which clamps the peripheral portion of the diaphragm upon the middle portion 2 of the housing, and surrounds the discs 21—22, so that the recess above the diaphragm constitutes a pressure chamber 26.

As will be apparent, pressure in the chamber 26 above the diaphragm will act to move the valves 15—16 downwardly and pressure below the diaphragm will act to move the valves upwardly.

In Figs. 1 and 2 bores 27 and 28 in the housing top portion 8, and a hole in the diaphragm 23 at 29, and a bore 30 in the middle housing portion 2, are provided and are axially aligned when the said housing portions are clamped together and constitute jointly a housing in which a pilot valve structure is mounted, indicated generally at 31, Fig. 1, and shown in section in Fig. 2 to enlarged scale.

The pilot valve structure 31 is an assembled unit which as a whole can be inserted into its housing or removed therefrom, but only when the housing portions 8 and 2 are detached from each other.

The pilot valve unit comprises a generally tubular outer shell 32 generally of smaller outside diameter than the bore 28, but intermediate its ends, is a large diameter portion 33, sealed upon the wall of the bore 28 by an O-ring 34.

At its upper end a plug element 35 is press fitted into the shell 32 and has a flange 36 overlapping the upper end of the shell, and, above the flange, has a portion 37 of reduced diameter inserted outwardly through and beyond the bore 27 and retained by a resilient embedded split ring 38, of well know type. At the lower end of the shell 32 it abuts upon an enlarged diameter intermediate portion 39 of a valve port element 40, sealed upon the wall of the bore 28 by an O-ring 41. The upper reduced diameter portion of the element 40 as at 42 is threaded into the lower end of the shell 32 and effects pressure on the aforesaid portion 39 and holds the parts 32 and 40 assembled, and leakproof; and a lower reduced diameter portion of the part 40, as at 43, projects into the bore 30 and is sealed therein by an O-ring 44. Holes 45 provide means for turning the part 40 to screw these parts tightly together.

The part 40, Fig. 2, has a bore 46 axially therethrough formed at its upper end to provide a lower valve port or seat 47; and laterally of the port is squared off in a plane at right angles to its axis as at 48 to provide an annular abutment surface 48 for a purpose to be described.

The inner wall of the tubular shell 32 is formed to provide an upper valve port 49.

The enlarged diameter portion 33 of the shell 32 spaces the outer wall of the shell from the wall of the bore 28 and provides upper and lower axially elongated annular chambers 50 and 51.

The upper chamber 50 communicates outwardly with an exhaust duct 52, and inwardly communicates through holes 53—53 in the shell wall, with the shell interior at points above the upper valve port 49.

The lower chamber 51, Fig. 2, communicates outwardly by a duct 54 with the aforesaid pressure chamber 26 (see also Fig. 1) and communicates inwardly through circumferentially spaced slots 55—55, see also Figs. 1 and 3, with the interior of the shell 32 above the valve port 47.

A reciprocable pilot valve element is provided comprising a valve stem 56 extending upwardly through and beyond a guiding bore 57 in the plug element 35; and at its lower end carries an upper valve 58 below and cooperating with the valve port 49, and a lower valve 59 above and cooperating with the lower valve port 47, the valves being spaced apart and connected by a neck 60.

The two valves 58 and 59 are spaced apart between their ports 49 and 47 so that when one moves to close its port, the other moves to open its port, and vice versa.

The valve 59 is generally cylindrical and is surrounded by a tubular guiding sleeve 61 having interiorly a sliding fit with the valve, and in normal operation, the sleeve is positioned by engaging, at its upper end, the under side of the valve 58 as in Fig. 2, and is held in that position by the friction of an O-ring 62 surrounding the neck 60 and under radial compression between the neck and the inside of the sleeve.

This tubular sleeve 61 is shown separately in Figs. 5 and 6. It comprises besides the said tubular portion proper, integral axially extending parallel ribs 63—63 in a series entirely therearound. The radially outer ends of the ribs define a cylinder, and engage with small clearance the inner cylindrical wall 64 of the tubular shell 32 on axially extending rectilinear lines of contact, as indicated in Fig. 6 and slidingly guide the reciprocations of the valve.

The lower end of the sleeve is provided with a diametrically opposite pair of recesses or notches 65—65.

Between the ribs 63 are grooves 66—66 which as will be apparent, from Figs. 2, 5 and 6, provide passageways open at both ends from the top of the sleeve to the bottom thereof or from the top of the sleeve to the notches 65; and disposed between the sleeve and the inner wall of the tubular shell 32.

The valves and stem are biased to an upper position, as shown in Fig. 3, by a spring 67 counterbalancing the weight of these parts; the spring reacting between the top of the plug element 35 and a washer 68 detachably secured to the stem in any suitable or well known manner, for example by a split ring in a groove on the stem.

Referring to Fig. 1 there is shown on top of the top portion 8 of the main housing, an electromagnet, having a winding 81, and preferably designed to be energized with alternating current. It comprises an upper stationary U-shaped half and a pivotally movable U-shaped lower half and is therefore of well known type and need not be fully illustrated. It comprises, besides the usual laminations, not shown, upper side plates 69 having feet 70, mounted by screws 72 upon posts 71 extending upwardly from the housing top portion 8. For simplicity, only the side plate 69, foot 70 and screw 72 on the front of the structure, and the post 71 at the rear of the structure have been shown. The side plates are bridged by a stationary bearing pin 73 carried by the post 7.

The lower half has side plates 74 extending upwardly between the side plates 69 and then toward the left as viewed and mounted to rock on the pin 73.

The rocking side plates have mounted thereon, by a screw 75, a finger 76, projecting into a loop 77 depending from the upper end of a strong helical spring 78, the lower end of the spring being telescoped over and centered by a circular rim 79 formed on a sheet metal base 80, that at one side engages the finger 76 and at the opposite side engages the upper end of the aforesaid pilot valve stem 56.

The magnet is shown in its energized condition with the lower rocking part rocked upwardly or counterclockwise and with the valve stem 56 pushed down by the spring 78, and correspondingly, the pilot valve parts are in the condition of Fig. 2 with the valve 59 held on its port 47 and with the port 49 open.

Description of the operation of the invention follows.

The magnet is considered as energized.

Air pressure from the supply source is communicated to the interior of the main housing 1 (Fig. 1) through the inlet 3 and acts upon the under side of the diaphragm 23.

Air under pressure also enters the bore 30 of the pilot valve Fig. 1, and goes up through the bore 46, Fig. 2, but is blocked off by the valve 59 closing its port 47 and held thereon against the pressure by the full force of the energized magnet acting through the powerful spring 78, Fig. 1, and overpowering the spring 67.

The pressure chamber 26, Fig. 1, exhausts through the duct 54 into chamber 51, and thence through slots 55, Figs. 1 and 2; and then, Fig. 2, flows upwardly through the passageways or grooves 66 of the sleeve 61 and through the open valve port 49 and out to atmosphere by way of the holes 53, chamber 50 and outlet 52.

The air pressure thus applied to the lower side of the diaphragm 23 moves the main valve stem 14 upwardly, opening the port 11 and closing the port 13 and the main valves 15 and 16 are then as in Fig. 1, and air under pressure goes through the port 11 and out of the outlet 4 to the apparatus to be operated, or, as herein considered, to the cylinder of a brake to release the brake.

When the magnet is deenergized, its rocking lower half as described will not longer be held magnetically in the illustrated counterclockwise position; and is returned in the other direction by a spring 82 connected between the upper side plates 69 and the lower side plates 74 at a point to the left of the pin 73. The pilot valve is thus relieved of the force of the spring 78.

The incoming air pressure, acting upwardly through the pilot valve bore 46, pushes upon the valve 59 and lifts it from its port 47, and supplemented by the biasing spring 67, moves the valve 58 upwardly to close its port 49, cutting off exhaust from the main valve pressure chamber 26. The parts of the pilot valve are then in the position of Fig. 3. Air under pressure now flows through the bore 46 and the port 47, laterally through the slots 55 into the chamber 51, thence by duct 54, Figs. 3 and 1, to the main pressure chamber 26 and to the upper side of the diaphragm 23 and pushes the valve stem 14 down, closing valve port 11 and opening exhaust port 13.

Pressure is now cut off from the served apparatus, or as here considered, the brake cylinder, and it exhausts back through the outlet 4, now acting as an inlet, and thence exhausts out of the outlet 7.

The guide sleeve 61 normally moves up and down with the valve 59 to which it is attached by the friction developed on it by the O-ring 62 under radial compression.

As described, whether the valve 59, is guided by a separate sleeve as here, or whether it is guided directly without a sleeve, may cause the valve to stick, by impurities from the air accumulating in the small clearance at the guiding surfaces.

The critical occasion is when the valve 59 is in the position of Fig. 2, because if it should stick in that position, the exhaust from the main pressure chamber 26 would remain open and pressure in the main housing would hold the main exhaust valve closed, even if the magnet were deenergized, thus exposing workmen to danger as hereinbefore explained.

The outer ends of the ribs 63 of the sleeve 61 which guide the valve 59 are rounded and contact the cylinder wall 64 only on rectilinear lines of contact and therefore afford very little or no area on which impurities can accumulate and cause sticking as described; and the possibility of sticking is practically eliminated thereby.

If the valve 59 nevertheless should stick in its upper position, it will be in the position to supply pressure to the pressure chamber 26, and cause the main valve 16 to go to the safety exhaust position. But if the valve 59 should stick in the lower position, that is the "critical" or danger position referred to which would exhaust the pressure chamber 26 it would cause the exhaust valve 16 to close.

To prevent the valve 59 from being held in critical position by sticking, the following mode of operation is provided for.

If the sleeve 61 should stick in its lower position, then when the magnet is deenergized, air pressure on the underside of the valve 59 will overcome the friction of the O-ring 62 and the valve 59 will be moved up leaving the sleeve behind, and to the position that cuts off exhaust from the pressure chamber 26, and supplies pressure to it; and the main valve 16 will be moved to the safety exhaust position; the path of the flow to the pressure chamber being as before, in Fig. 3, but now also through the notches or recess 65—65 of the sleeve, that being the main purpose of the recesses.

The position of the parts in this condition is shown in Fig. 4, and it will be seen that the O-ring 62 has moved with the valve 59 up to the top of the stuck sleeve 61 and being free to expand diametrically has expanded until it at least partly overlaps the top of the sleeve.

If now the magnet be energized tending to return the valve 59 and the O-ring downwardly, the O-ring will jam on the top of the sleeve and the sleeve will be pushed down upon the annular abutment 48 and stopped there, and the valve will thus be locked in its upper position, the effect of which is to keep the main pressure chamber under pressure and the main valve 16 in the exhaust or safety position. It is thus impossible for the pilot valve to move to the down position which would effect closing of the main exhaust port 13.

With the sleeve stuck as referred to, the pilot valve as a whole is not in good operative condition, because it cannot be guided freely by the sleeve, and is intentionally put out of operation by the locking action described. To restore it to normal operating condition, it is thus intentionally required that the pilot valve construction be removed and cleaned and replaced, or a clean one substituted; and this is done by detaching the top portion 8 of the main housing and withdrawing the unitary pilot valve assembly out of its housing bores.

Safety features are inherent in the structure as described above, as follows.

Due to the great difference of the effective areas subjected to pressure in the chamber 26 above the diaphragm 23 and in the housing below it, the pressure chamber 26 must be fully exhausted before supply pressure can raise the main valve to release the brake, but only about 30% to 35% of full pressure in the chamber 26 is enough to move the main valve to set the brake; whereby unreliable operation of the press at substantialy reduced pressure is avoided, and free operation of the pilot valve must obtain for press operation.

Again, in the normal operation of the press the magnet 81 is deenergized to free the pilot valve to be raised by supply pressure to supply pressure to the chamber 26 to move the main valve to exhaust the brake cylinder and set the brake. If at this time the supply pressure has failed, so that the pilot valve cannot be raised thereby, it nevertheless will be raised both by the biasing spring 67, and by back pressure from the brake cylinder in the main valve housing communicated through the open valve 15; and the main valve therefore will move to exhaust position and set the brake.

Again, if the magnet 81 should fail it will release the pilot valve and not hold it in the down position at which it causes the main valve to release the brake, and the supply pressure in the main housing will move the pilot valve to its up position and cause the main valve to move to exhaust position and set the brake.

Thus in the event of failure of the magnet or its control circuit, or in the event of failure of supply pressure, the main valve will go to exhaust position and set the brake; and the press cannot be operated until such failure is corrected.

I claim:

1. A pilot valve construction comprising a pilot valve housing provided with a first and a second valve port; and a reciprocable valve element having two valves which, upon reciprocation, close one port and open the other and vice versa; a control electromagnet which when energized moves the valve element to close the first port; and open the second port; the first port having duct communication with an outside supply source of air pressure, which when the first port is closed and the magnet is deenergized, moves the valve element to open the first port and close the second port; the valve element having a portion with a generally cylindrical surface between the ports contacting the wall of a cylindrical valve housing bore, but with clearance, to slidingly guide the reciprocations of the valve element with respect to its ports; the said cylindrical surface portion having longitudinal grooves providing intermediate ribs of small circumferential extent and area, whereby the contact with the bore wall is on the small area of the ribs; the air from the source flowing through the open first port when opened by the air pressure and thence through duct means to a pressure chamber; the air pressure in the chamber exhausting therefrom through duct means and through the grooves and through the second part when opened by the magnet; the pressure chamber having a movable wall, connected to a main valve to position it responsive to alternate movements of the wall upon subjecting the chamber to pressure and exhausting its pressure; the aforesaid area of contact at the ribs being proportioned to be small enough to provide free reciprocation of the guided valve element by the magnet and by the air pressure in spite of any accumulation of impurities on the ribs or on the bore wall deposited from the air flowing through the grooves.

2. A valve construction comprising a valve housing provided with a valve port; a valve element provided with a valve; means to reciprocate the valve element to move the valve to close the port and open it; the housing having a guideway surface, and the valve element having a guide element thereon; the guide element slidingly engaging the guide surface with small clearance to guide reciprocations of the valve element; the guide element and valve element being movable relatively when the valve element moves the valve away from the port but relative movement being normally restrained by means producing friction between the valve element and guide element, causing them to move in unison; the guide element being subject to sticking at its sliding engagement with the guideway; the sticking of the guide element causing it to remain behind when the valve element is moved away from the port by force overcoming the said friction; means thereafter blocking movement of the valve element toward the port relative to the guide element.

3. A valve construction comprising a valve housing provided with a valve port; a valve element provided with a valve; means to reciprocate the valve element to move the valve to close the port and open it; the housing having a guideway surface, and the valve element having a guide element thereon; the guide element slidingly engaging the guide surface with small clearance to guide reciprocations of the valve element; the guide element and valve element being movable relatively when the valve element moves the valve away from the port but relative movement being normally restrained by means producing friction between the valve element and guide element, causing them to move in unison; the guide element being subject to sticking at its sliding engagement with the guideway; the sticking of the guide element causing it to remain behind when the valve element is moved away from the port by force overcoming the said friction; and means then reacting between the valve element and the guide element blocking return movement of the valve element toward the port relative to the guide element, and abutment means preventing movement of the guide element by the return movement of the valve element to hold the valve port open.

4. A valve construction comprising a valve housing provided with a guide bore surface, and a coaxial port; a valve element in the bore provided with a valve; reciprocable to open and close the port; the valve element having a coaxial cylindrical portion, and a guide sleeve thereon; the outside of the sleeve engaging the bore surface with small clearance to guide valve element reciprocations; the cylindrical portion being slidingly movable in the sleeve in the direction to move the valve to open the port but normally restrained from such movement by a resilient ring of rubber or the like disposed in a groove in the valve element and under compression against the inner wall of the sleeve producing friction, causing the valve element and sleeve to move in unison; the sleeve being subject to sticking at the small clearance; the sticking of the sleeve causing it to remain behind when the valve element is reciprocated to open the port by force overcoming the friction; the rubber ring then expanding into axially abutting engagement with a portion of the sleeve and blocking return movement of the valve element toward the port relative to the sleeve, and abutment means engaged by a portion of the sleeve preventing return movement of the valve element and holding the valve port open.

5. In a valve construction, a valve housing; a valve element reciprocable to open and close a port provided in the housing; a guide element constrained to move in unison with the valve element by means producing friction between them and slidingly engaging a guide surface provided in the housing; the guide element subject to sticking at its sliding engagement with the guide surface; means to move the valve element to open the port and to overcome the friction and leave the sticking guide element behind; latch means effective upon leaving the guide element behind to latch the guide element to the valve element; whereby the valve element in order to return in the direction to close the port must move the guide element with it; and abutment means on the housing preventing such movement of the guide element and thereby locking the valve element in the port open position.

6. A pilot valve constructed to cooperate with a main valve construction that comprises, a main walled housing, enclosing a pressure chamber comprising a movable wall, a pair of valve ports, and a pair of opposed valves therefor movable by the movable wall upon the exhaust of pressure from the chamber or the application of pressure thereto, to respectively establish a flow line between inlet and outlet openings in the housing wall and open an exhaust out of the housing through the outlet opening; the pilot valve construction comprising a pilot valve housing having ports, and valves therefor; the valves carried by a reciprocable valve element; the ports having duct communication with the pressure chamber and with a source of pressure and with the atmosphere, and the parts arranged to apply pressure to the chamber and exhaust it therefrom upon reciprocation of the valve element; an electromagnet comprising a movable magnetic member; the magnetic member, when the magnet is energized, moving the pilot valve element to effect exhaust of the pressure chamber; means to communicate air pressure from a supply source of pressure to the valve element to move it, when the magnet is deenergized, to effect supply of pressure to the pressure chamber, the valve element being guided in its reciprocations by a guide element slidingly engaging a guide surface of the pilot valve housing with small clearance and being subject to sticking at said clearance; and latch means rendered effective upon the occurrence of said sticking by reciprocation of the valve element in the direction to supply pressure to the pressure chamber, to lock the valve element against return movement in the direction to exhaust pressure from the pressure chamber.

7. A pivot valve construction comprising a housing having a housing bore with a cylindrical bore wall; an air duct communicating at one end with atmospheric air from a source under pressure and at the other end opening through a valve port into the bore; a valve having a body in the bore reciprocable therein and a valve on the body to correspondingly close and open the port: the body beyond the port having passages through which air from the port flows when the port is open; the passages consisting of spaces between ribs provided on the side of the body; the ribs extending axially of the body and their free ends contacting the bore wall with clearance and guiding reciprocations of the valve body; the surfaces on the free ends of the ribs being each convexly rounded to conform substantially a cylindrical surface of smaller radius than that of the cylindrical bore wall to cause it to be tangential thereto and to cause said contact of the ribs with the cylindrical bore wall to be on rectilinear lines parallel to the bore axis, and to prevent contact on an area of the cylindrical bore wall; whereby impurities in the air from the source flowing through the passages, when the valve is open, is prevented from accumulating between an area on the cylindrical bore wall and an area on the valve and in consequence is prevented from interfering with free guided movement of the valve body.

References Cited in the file of this patent

UNITED STATES PATENTS

| | | |
|---|---|---|
| 824,658 | Junggren | June 26, 1906 |
| 2,587,357 | McPherson | Feb. 26, 1952 |
| 2,617,444 | Gardner | Nov. 11, 1952 |
| 2,754,840 | Hicks | July 17, 1956 |